US010190358B2

(12) United States Patent
Makke et al.

(10) Patent No.: US 10,190,358 B2
(45) Date of Patent: Jan. 29, 2019

(54) VEHICLE SAFE AND AUTHENTICATION SYSTEM

(71) Applicant: Ford Global Technologies, LLC, Dearborn, MI (US)

(72) Inventors: Omar Makke, Lyon Township, MI (US); Andrea Bowes Chowanic, Commerce Township, MI (US); Manpreet Singh Bajwa, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/939,447

(22) Filed: Nov. 12, 2015

(65) Prior Publication Data
US 2017/0138112 A1    May 18, 2017

(51) Int. Cl.
| | | |
|---|---|---|
| *E05G 1/10* | (2006.01) | |
| *B60R 1/00* | (2006.01) | |
| *B60R 25/30* | (2013.01) | |
| *E05B 37/00* | (2006.01) | |
| *E05B 39/04* | (2006.01) | |
| *E05B 65/00* | (2006.01) | |
| *G01S 19/13* | (2010.01) | |

(Continued)

(52) U.S. Cl.
CPC .................. *E05G 1/10* (2013.01); *B60R 1/00* (2013.01); *B60R 25/305* (2013.01); *E05B 37/00* (2013.01); *E05B 39/04* (2013.01); *E05B 65/0075* (2013.01); *G01S 19/13* (2013.01); *G07C 9/00309* (2013.01); *B60R 2300/8006* (2013.01); *E05B 2047/0067* (2013.01); *E05B 2047/0072* (2013.01)

(58) Field of Classification Search
CPC ....... B60R 7/087; B60R 25/305; E05G 1/005; E05B 39/04; E05B 65/0075; G07C 9/00174
See application file for complete search history.

(56) References Cited

U.S. PATENT DOCUMENTS 5,819,124 A * 10/1998 Somner ............ G08B 13/19632
396/263
2005/0232747 A1    10/2005 Brackmann et al.
(Continued)

FOREIGN PATENT DOCUMENTS

CN    2825367 Y    10/2006
CN    101761285 A    6/2010
(Continued)

OTHER PUBLICATIONS

Search Report in corresponding international patent application No. GB1619122.3 dated May 2, 2017, 6 pages.
(Continued)

*Primary Examiner* — Hongmin Fan
(74) *Attorney, Agent, or Firm* — Frank MacKenzie; Brooks Kushman, P.C.

(57) ABSTRACT

A vehicle safe authentication system may include a vehicle safe, a vehicle camera, and a control unit programmed to receive an indication of unauthorized access at the vehicle safe and further programmed to activate the vehicle camera in response to the indication, wherein activation of the camera may include capturing at least one image.

12 Claims, 9 Drawing Sheets

(51) Int. Cl.
*G07C 9/00* (2006.01)
*E05B 47/00* (2006.01)

(56) References Cited

U.S. PATENT DOCUMENTS

| | | | |
|---|---|---|---|
| 2005/0242930 A1* | 11/2005 | Nicolson | B60R 25/1001 340/426.36 |
| 2008/0297346 A1 | 12/2008 | Brackmann et al. | |
| 2009/0165682 A1* | 7/2009 | Cleveland | G06F 21/86 109/23 |
| 2010/0253519 A1 | 10/2010 | Brackmann et al. | |
| 2011/0279225 A1* | 11/2011 | Frontino | G07D 11/0066 340/5.3 |
| 2013/0055933 A1 | 3/2013 | Markman et al. | |
| 2013/0340656 A1 | 12/2013 | Rainier | |
| 2016/0053526 A1* | 2/2016 | Dittrich | E05G 1/026 109/38 |
| 2016/0203687 A1* | 7/2016 | Lee | G08B 25/10 340/545.2 |

FOREIGN PATENT DOCUMENTS

| | | |
|---|---|---|
| CN | 202139953 U | 2/2012 |
| CN | 102852426 A | 1/2013 |
| CN | 203047019 U | 7/2013 |
| CN | 104343314 A | 2/2015 |
| CN | 204184260 U | 3/2015 |
| DE | 20006048 U | 6/2000 |
| DE | 202015001961 U1 | 10/2015 |
| GB | 2318333 A | 4/1998 |
| GB | 2423922 B | 5/2006 |
| GB | 2503030 A | 12/2013 |
| JP | 2010237826 A | 10/2010 |
| WO | 2013176526 A1 | 11/2013 |

OTHER PUBLICATIONS

Search Report under Section 17(6) in corresponding international patent application No. GB1619122.3 dated Dec. 14, 2017, 3 pages.

* cited by examiner

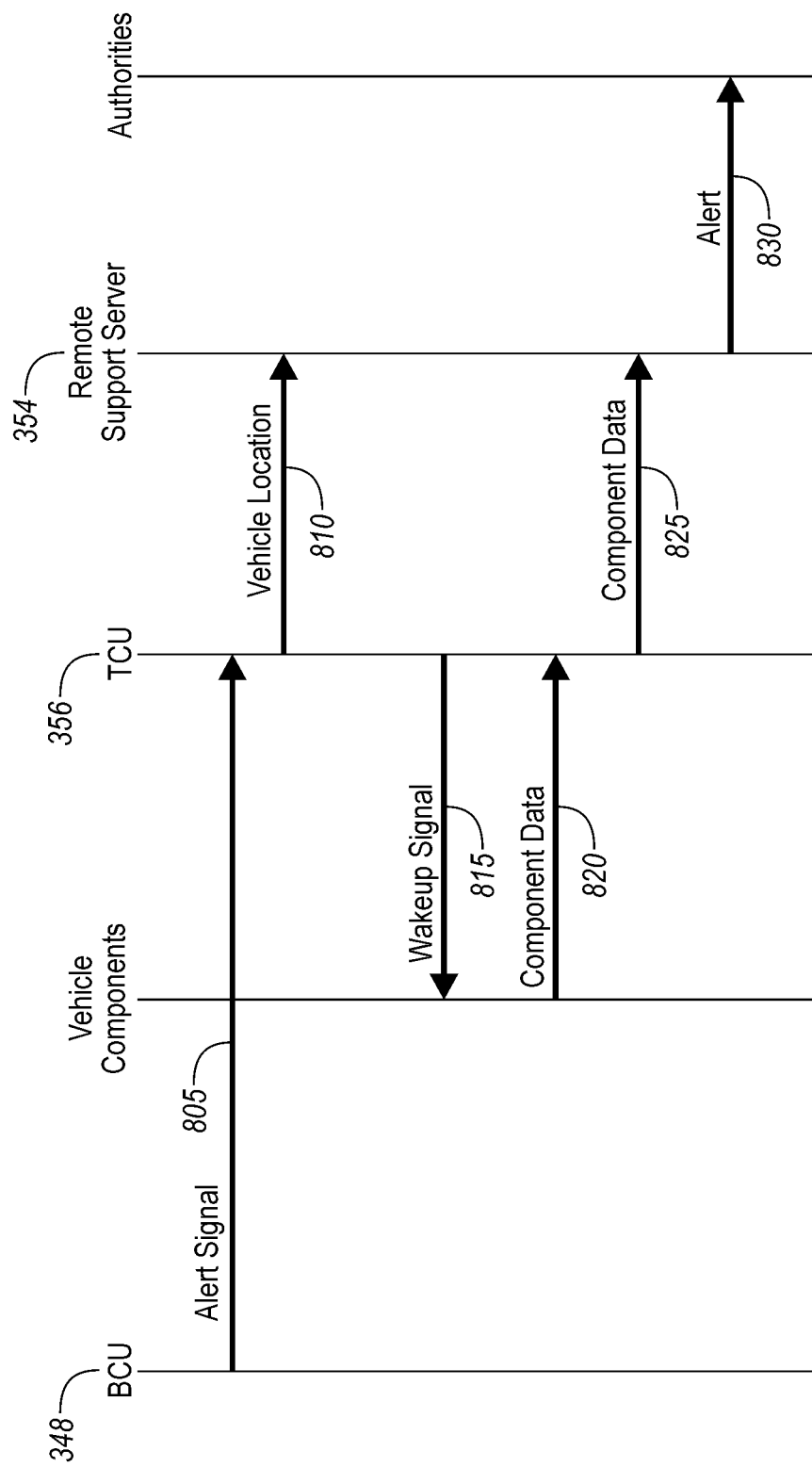

VEHICLE SAFE AND AUTHENTICATION SYSTEM

TECHNICAL FIELD

Disclosed herein are vehicle safes and authentication systems.

BACKGROUND

Vehicles often house valuable items during non-use due to an increasing amount of users leaving valuable items in their vehicle when the vehicle is not in use. Some vehicles include separate compartments, such as a glove box, that is lockable with a physical key. However, these systems are often small, keys are often misplaced, and retrieval of objects within the locked compartment may require a replacement key supplied by a dealer. Additionally, these compartments are susceptible to theft.

SUMMARY

A vehicle safe authentication system may include a vehicle safe, a vehicle camera, and a control unit programmed to receive an indication of unauthorized access at the vehicle safe and further programmed to activate the vehicle camera in response to the indication, wherein activation of the camera may include capturing at least one image.

A vehicle safe authentication system may include a vehicle safe, a vehicle camera, and a controller programmed to receive user input including one of a user password and a special password, and to transmit a command for the vehicle camera to capture at least one image in response the user input including the special password.

A method may include receiving an alert signal indicating an unauthorized access attempt of an in-vehicle safe, instructing at least one vehicle component to activate in response to the alert signal, the vehicle component including at least one of a camera and microphone, identifying a vehicle location, receiving component data from the vehicle component, and transmitting the component data and vehicle location to a remote server.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

FIG. 8 illustrates an example process flow for activating various components in response to an authentication threat.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Disclosed herein is a safe authentication system including an in-vehicle safe configured to communicate with various vehicle interfaces and mobile applications to provide secure mechanisms for locking and unlocking the vehicle safe. Upon receiving indication that an unauthorized access attempt may be in progress, a telematics control unit may activate various vehicle components, such as vehicle cameras, in an effort to capture images of the potential unauthorized access. The control unit may transmit these images, along with a vehicle location, to the appropriate authorities. The control unit may also authenticate users in the event that a password has been forgotten.

Figure 1A:
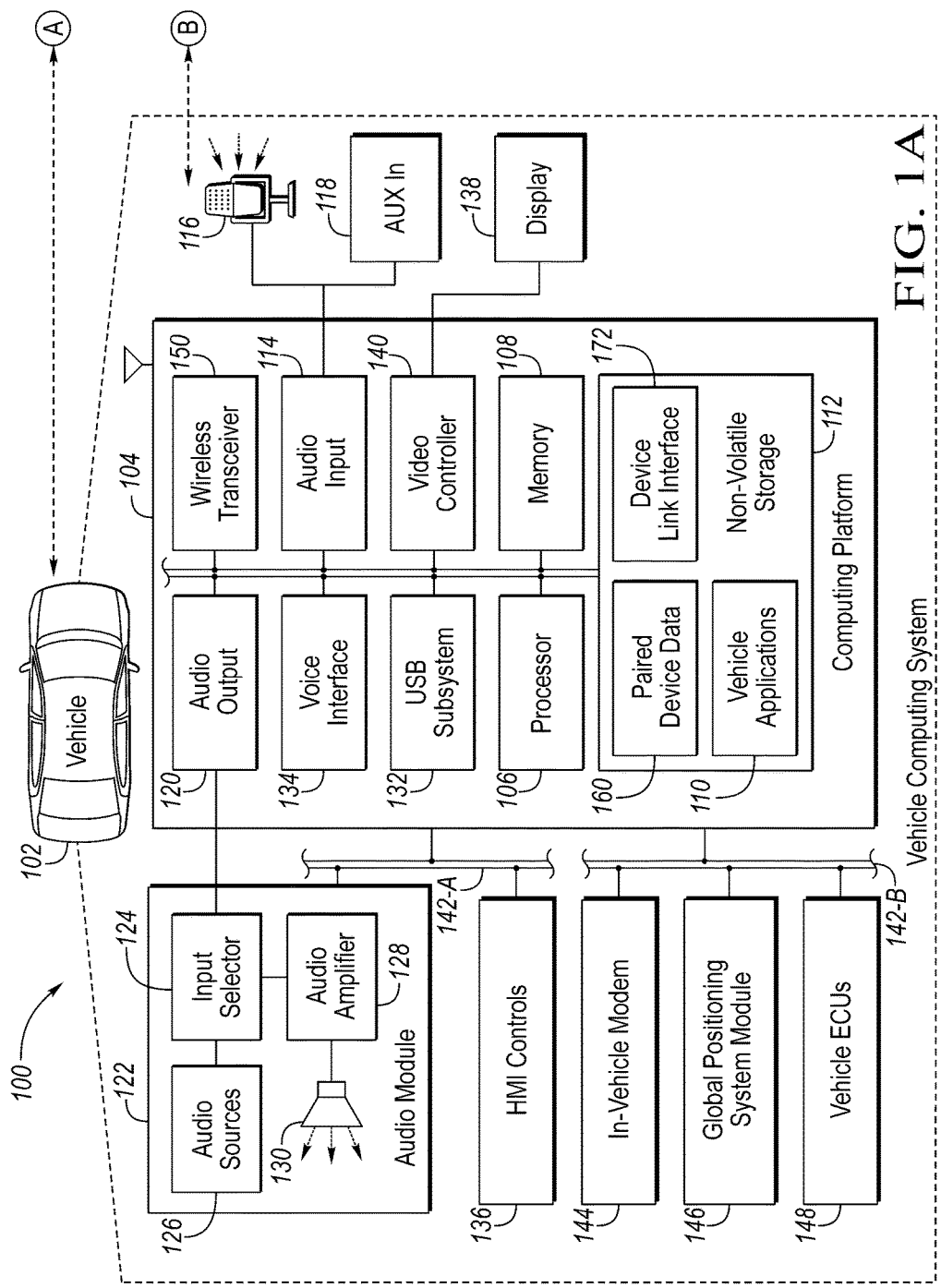
FIGS. 1A and 1B illustrate an example diagram of a system that may be used to provide telematics services to a vehicle.
Figure 1B:
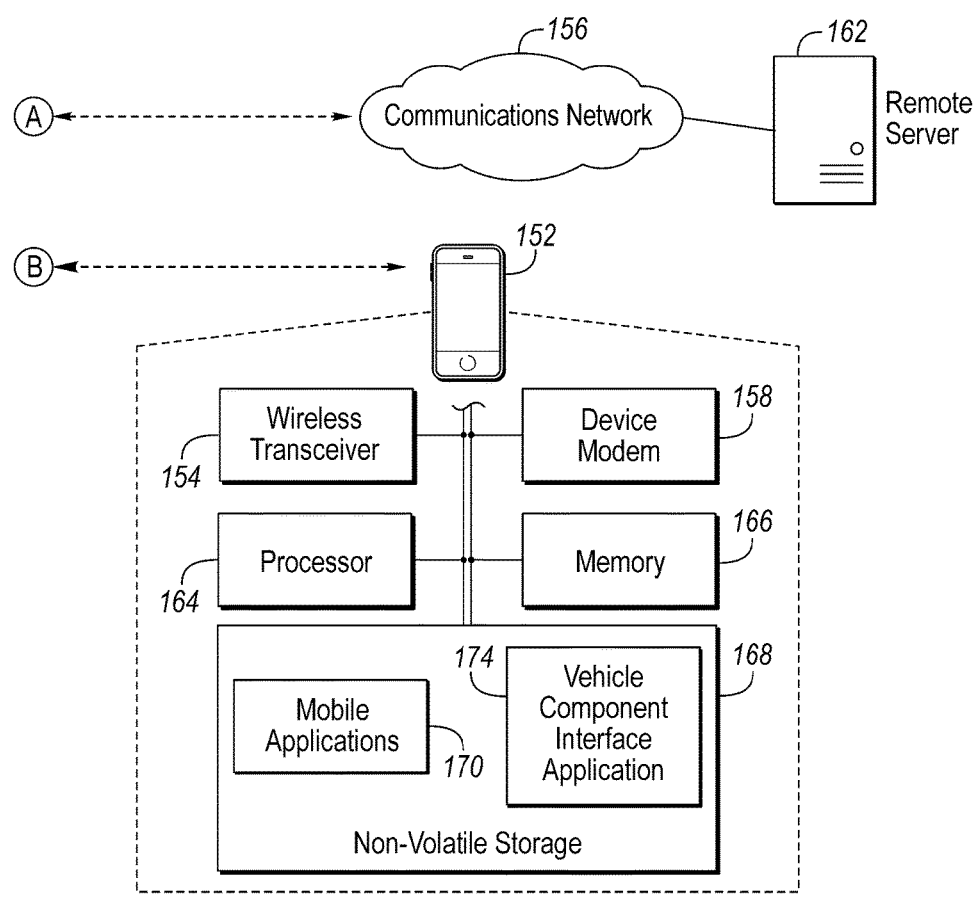

FIGS. 1A and 1B illustrate an example diagram of a system 100 that may be used to provide telematics services to a vehicle 102. The vehicle 102 may be one of various types of passenger vehicles, such as a crossover utility vehicle (CUV), a sport utility vehicle (SUV), a truck, a recreational vehicle (RV), a boat, a plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 and controllers configured to perform instructions, commands and other routines in support of the processes described herein. For instance, the computing platform 104 may be configured to execute instructions of vehicle applications 110 to provide features such as navigation, accident reporting, satellite radio decoding, hands-free calling and parking assistance. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of an audio module 122 having audio playback functionality. In other examples, the computing platform 104 may provide the audio output to an occupant through use of one or more dedicated speakers (not illustrated). The audio module 122 may include an input selector 124 configured to provide audio content from a selected audio source 126 to an audio amplifier 128 for playback through vehicle speakers 130 or headphones (not illustrated). The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to grammar associated with available commands, and voice prompt generation for output via the audio module 122. In some cases, the system may be configured to temporarily mute or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

Figure 3:
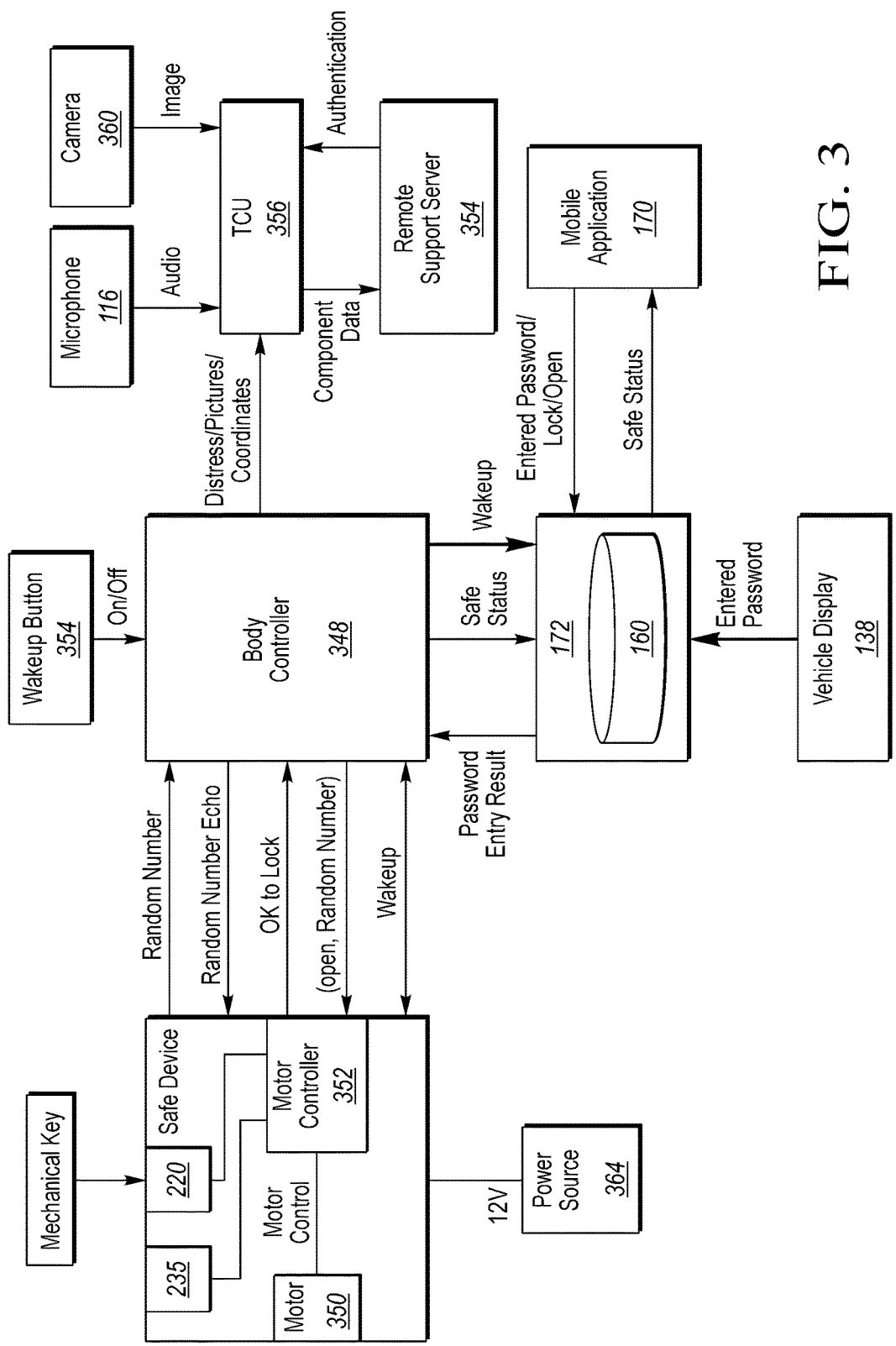
FIG. 3 illustrates an example block diagram of a portion of a safe authentication system.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as a vehicle modem 144 (which may not be present in some configurations), a global positioning system (GPS) module 146 configured to provide current vehicle 102 location and heading information, and various vehicle ECUs 148 configured to cooperate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module (as shown in FIG. 3 as body controller 348) configured to manage various power control functions such as exterior lighting, interior lighting, keyless entry, remote start, and point of access status verification; a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio module 122 and the HMI controls 136 may communicate with the computing platform 104 over a first in-vehicle network 142-A, and the vehicle modem 144, GPS module 146, and vehicle ECUs 148 may communicate with the computing platform 104 over a second in-vehicle network 142-B. In other examples, the computing platform 104 may be connected to more or fewer in-vehicle networks 142. Additionally or alternately, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. Additionally or alternately, the computing platform 104 may communicate with the mobile device 152 over a wired connection, such as via a USB connection between the mobile device 152 and the USB subsystem 132.

The communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, such that the computing platform 104 may automatically reconnected to the mobile devices 152 referenced in the paired device data 160 without user intervention.

When a mobile device 152 that supports network connectivity is paired with the computing platform 104, the mobile device 152 may allow the computing platform 104 to use the network connectivity of the device modem 158 to communicate over the communications network 156 with the remote telematics services 162. In one example, the computing platform 104 may utilize a data-over-voice plan or data plan of the mobile device 152 to communicate information between the computing platform 104 and the communications network 156. Additionally or alternately, the computing platform 104 may utilize the vehicle modem 144 to communicate information between the computing platform 104 and the communications network 156, without use of the communications facilities of the mobile device 152.

Similar to the computing platform 104, the mobile device 152 may include one or more processors 164 configured to execute instructions of mobile applications 170 loaded to a memory 166 of the mobile device 152 from storage medium 168 of the mobile device 152. In some examples, the mobile applications 170 may be configured to communicate with the computing platform 104 via the wireless transceiver 154 and with the remote telematics services 162 or other network services via the device modem 158. The computing platform 104 may also include a device link interface 172 to facilitate the integration of functionality of the mobile applications 170 into the grammar of commands available via the voice interface 134 as well as into display 138 of the computing platform 104. The device link interfaced 172 may also provide the mobile applications 170 with access to vehicle information available to the computing platform 104 via the in-vehicle networks 142. Some examples of device link interfaces 172 include the SYNC APPLINK component of the SYNC system provided by The Ford Motor Company of Dearborn, Mich., the CarPlay protocol provided by Apple Inc. of Cupertino, Calif., or the Android Auto protocol provided by Google, Inc. of Mountain View, Calif. The vehicle component interface application 174 may be once such application installed to the mobile device 152.

The vehicle component interface application 174 of the mobile device 152 may be configured to facilitate access to one or more vehicle 102 features made available for device configuration by the vehicle 102. In some cases, the available vehicle 102 features may be accessible by a single vehicle component interface application 174, in which case such the vehicle component interface application 174 may be configured to be customizable or to maintain configurations supportive of the specific vehicle 102 brand/model and option packages. In an example, the vehicle component interface application 174 may be configured to receive, from the vehicle 102, a definition of the features that are available to be controlled, display a user interface descriptive of the available features, and provide user input from the user interface to the vehicle 102 to allow the user to control the indicated features. As exampled in detail below, an appropriate mobile device 152 to display the vehicle component interface application 174 may be identified (e.g. mobile display 176), and a definition of the user interface to display may be provided to the identified vehicle component interface application 174 for display to the user.

Systems such as the system 100 may require mobile device 152 pairing with the computing platform 104 and/or other setup operations. However, as explained in detail below, a system may be configured to allow vehicle occupants to seamlessly interact with user interface elements in their vehicle or with any other framework-enabled vehicle, without requiring the mobile device 152 or wearable device to have been paired with or be in communication with the computing platform 104.

Additionally, the wireless transceiver 150 may receive and transmit data regarding the vehicle's position to other vehicles in vehicle-to-vehicle communication. Such vehicle-to-vehicle communications may include various wireless communication protocols including near-field wireless communication, WiFi, Bluetooth™, etc.

The remote server 162 and communications network 156 may also facilitate transmission of other vehicle-to-vehicle data such as data acquired from other mobile applications and websites such as Google Maps™, Waze™, etc. In these examples, data may be shared between users and used to determine the location of other vehicles, emergency situations, etc.

Figure 2:
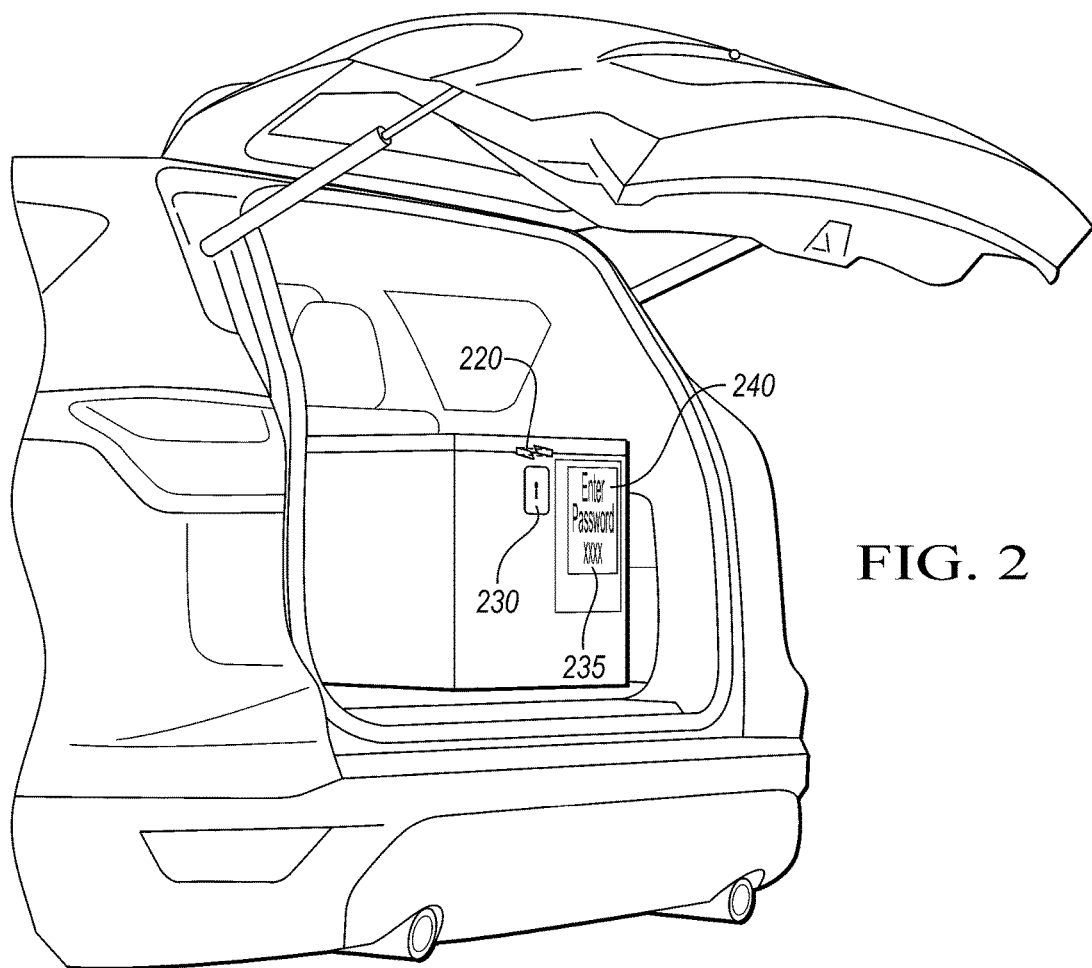
FIG. 2 illustrates an example safe device for a vehicle trunk safe.

FIG. 2 illustrates a perspective view of an example safe device 200. The safe device 200 may include a safe container 205 configured to maintain items including valuables, or potentially dangerous times such as firearms and medications. The container 205 may be made of fire-safe materials to prevent damage to the interior of the container 205 during a fire. Furthermore, the container 205 may be made of heavy-duty materials in order to withstand extreme wear and tear. In the event of a vehicle accident, the safe container 205 may be configured to protect the contents therein.

The safe device 200 may include a safe door 210 configured to open and close, permitting users to gain access to the interior of the safe container 205. The safe device 200 may include a locking mechanism 220 configured to lock the door 210 in a closed position. The locking mechanism 220 may include a mechanical, electronic, electro-mechanical fastening device, etc. Specifically, the locking mechanism 220 may include a tubular lock, a pin lock, a cam lock, etc. The safe container 205 may include a mechanical key hole 230 configured to receive a mechanical key for unlocking and locking the locking mechanism 220. The safe container 205 may also include and electronic key interface 235. The locking mechanism 220 may be locked and unlocked via a mechanical key at the mechanical key hole 230 or the electronic key interface 235.

The electronic key interface 235 may include a display 240 configured to receive user input. The display 240 may be a liquid crystal display (LCD), touchscreen, etc. At the display 240 a user may unlock and lock the locking mechanism 220 by entering certain credentials at the display 240. The display 240 may also be configured to present various screens to the user such as access denied screens, access granted screens, as well as screens indicative of the locking mechanism status (e.g., "locked", "unlocked", "ajar", etc.)

The safe device 200 may be unlocked via the display 240 and/or a mechanical key at the mechanical key hole 230. Additionally or alternatively, the safe device 200 may be unlocked by a remote interface. The remote interface may be presented via the vehicle display 138 or mobile device 152. User input may be received at these interfaces, including user credentials such as usernames, passwords, etc.

The safe device 200 may be fixed within the vehicle 102. In the example shown in FIG. 2, the safe device 200 may be fixed within the vehicle trunk. The safe device 200 may be installed during assembly of the vehicle. It may also be installed after assembly, but still may be permanently or semi-permanently fixed within the vehicle in an effort to prevent unauthorized users from walking away with the safe.

FIG. 3 illustrates an example block diagram of a portion of a safe authentication system 300. The safe authentication system 300 may include the safe device 200. As shown in FIG. 3, the mechanical key hole 230 may be adjacent to the locking mechanism 220, such that access to the safe device 200 may be granted by inserting and turning a mechanical key in the mechanical key hole 230. The locking mechanism 220 may be electronically connected to a motor controller 352. The locking mechanism 220 may be configured to transmit a locking mechanism status, or lock status, to the motor controller 352. The locking mechanism status may be indicative of whether the safe is locked or unlocked. The display 235 may be in electronic communication with a motor controller 352.

The motor controller 352 may be an electronic communication with a motor 350 configured to drive a portion of the locking mechanism 220. That is, the motor 350 may rotate a portion of the locking mechanism 220 into a lock or unlock position. The motor controller 352 may provide instructions to the motor 350 based on user input at the display 235 or at other interfaces such as those on the mobile device 152 and vehicle display 138. For example, upon entering a valid username and pin at the display 235, the motor controller 352 may transmit an open lock command to the motor 350. The motor 350 may in turn unlock the locking mechanism 220. The motor controller 352 may be a controller area network (CAN) bus configured to communicate with a body controller 348. The motor controller 352 may be awakened by the body controller 348 when access to the safe device 200 is attempted from a remote display such as the vehicle display 138 or mobile device 152.

The safe device 200 may be powered by a power source 364. The power source 364 may provide approximately 12 volts to the device 200 and may be connected to a vehicle battery. Additionally or alternatively, the power source 364 may be a stand-alone power source configured to supply power to the safe device 200.

The safe authentication system 300 may include the body controller 348. The body controller 348 may be part of the electronic control unit (ECU) 148, as shown as part of FIG. 1A. The body controller 348 may be in communication with a wakeup button 366. The wakeup button 366 may be a physical button arranged on or near the dashboard of the vehicle 102 configured to initiate authentication of the user for purposes of unlocking the safe device 200. The wakeup button 366, upon depression, may be configured to send signals to each of the controllers, including but not limited to the body controller 348, the vehicle display 138, the motor controller 352 and the TCU 356.

The body controller 348 may be in communication with a portion of the computing platform 104, specifically the device link interface 172. As explained, the device link interface 172 may include the SYNC APPLINK component of the SYNC system provided by The Ford Motor Company. The link interface 172 may include paired device data 160. This paired device data 160 may maintain unique device identifiers, user identification, and associated passwords or credentials therewith. The passwords may include user specific unique identification codes or words, when paired with the user identification, and may be used to gain access to the safe device 200. Such passwords, may be received via the safe display 235, the vehicle display 138 such as a heads up display or console display, and/or a mobile display 176.

The device link interface 172 may interface with the mobile device 152 via wireless communication as discussed above. The mobile device 152 may include a mobile application 170 configured to display information relevant to the safe device 200. In one example, the mobile application 170 may display a safe status such as "locked", "unlocked", "ajar", etc. In another example, the mobile application 170 may be configured to display a login screen or access screen configured to receive user input in order to gain access to the safe device 200.

The body controller 348 may also be in communication with a telematics control unit (TCU) 356. The TCU 356 may include the GPS module 146, or be in communication with the same. The TCU 356 may be in communication with a vehicle camera 360. The vehicle camera 360 may be one or more existing vehicle cameras such as vehicle cameras used by other systems including but not limited to an active park assist system. The TCU 356 may instruct the camera 360 to capture images in response to indications of unauthorized access at the safe device 200. This is described in greater detail herein.

The TCU 356 may also be configured to communicate with an external support server 354, similar to the remote server 162 shown in FIG. 1B. This communication may be achieved via a wireless communication. In response to indications of unauthorized access at the safe device 200, the TCU 356 may transmit the images captured at the camera 360 to the support server 354. The images may then be used by authorities or other personnel to identify perpetrators. Additionally or alternatively, the images may also be used to authenticate users based on true ownership. Such authentication may be achieved via facial recognition, or other biometric comparisons. The images may be accompanied by a location acquired via the TCU 356.

The safe authentication system 300 may be configured to operate in one of several modes. A first mode may include a mode configured to grant access to the safe device 200 in response to authentication of the user. A second mode may include a mode configured to grant limited access to the safe device 200 in response to the use of an emergency password being used to access the safe device 200. In the second mode, the safe device 200 may be unlocked. However, in response to the emergency password being used, other vehicle systems may be enabled to capture and report events and persons surrounding the vehicle. In one example, the camera 360 may be instructed to capture images. In another example the microphone may be instructed to be turned on. In addition to these vehicle components being enabled, the TCU 356 may instruct the external support server 354 to notify emergency personnel that an unauthorized access attempt may be in progress. The TCU 356 may transmit the current vehicle location to the authorities. Such security measures may permit access to the safe device 200 in the event that a user must access items within the safe container 205 during an emergency situation (e.g., medical supplies are needed.) At the same time, the remote support server 354 may receive additional information about the vehicle in response to the emergency password being used to prevent abuse or unauthorized access to the safe authentication system 300. These processes are described in more detail below.

Figure 4:
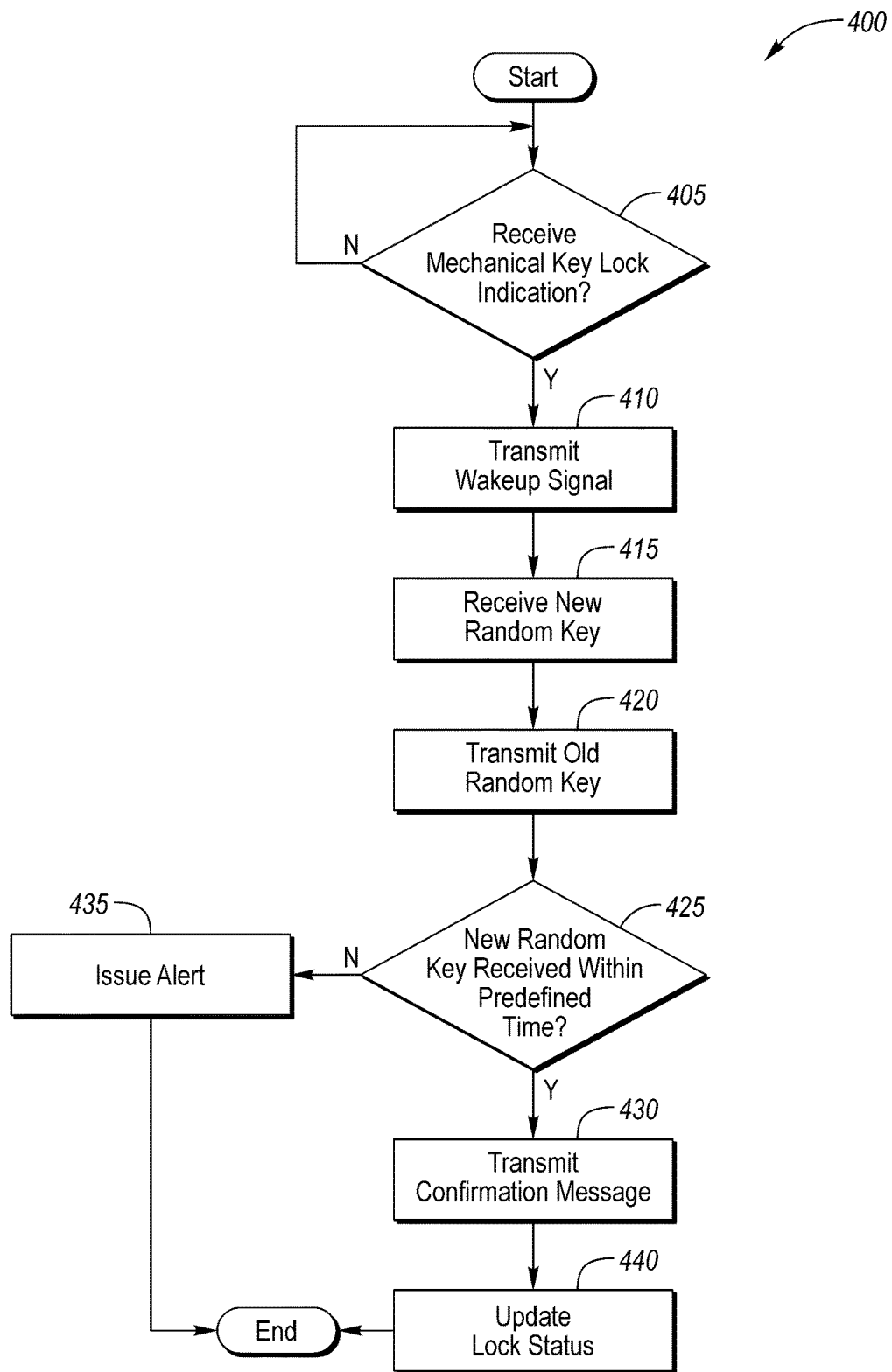
FIG. 4 illustrates an example process for the safe authentication system.

FIG. 4 illustrates an example process 400 for locking the safe device 200 using a mechanical key. The process may begin at block 405 where the motor controller 352 may determine whether the locking mechanism 220 has been locked via a mechanical key. The motor controller 352 may receive such indication via a signal transmitted from the locking mechanism 220 in response to the locking mechanism 220 been locked via a mechanical key at the mechanical hole 230. In one example, the locking mechanism 220 may include a switch configured to be depressed in response to a turning of a pin at the locking mechanism. That is, once mechanical key is turned within the key hole 230 the switch may be depressed sending a locking signal to the motor controller 352. If the motor controller 352 determines that a mechanical key was used to block the safe device 200, the process 400 proceeds to block 410.

At block 410, the motor controller transmits a wakeup signal to the body controller 348.

At block 415, the motor controller 352 receives a new random key from the body controller 348. Random keys are exchanged between the motor controller 352 and body controller 348 so as to avoid middle-man attacks.

At block 420, the motor controller 352, in response to receiving the new random key, transmits an old random key to the body controller 348.

At block 425, the motor controller 352 determines whether the new random key was received from the body controller 348 within a predefined time. In one example, the predefined time may be an acceptable timeframe for which the motor controller 352 can expect to receive a response on the body controller 348. In one example the predefined time may be approximately 2.0 seconds. If the motor controller 352 determines that the new random key was received from the body controller 348 within the predefined time, the process 400 proceeds to block 430. If not, the process proceeds to block 435.

At block 430, the motor controller 352 transmits a confirmation message to the body controller 348. The confirmation message may include instructions that the body controller may save the new random key into memory. The new random team may then be recalled upon later access attempt, as discussed herein.

At block 435, the motor controller 352 may transmit an alert command to the safe display 235 instructing the display 235 to present an alert message indicating that the body controller 348 is not responding. This alert message may inform the user that there may be a problem with the communication between the body controller 348 and the safe device 200. The alert message may also explain, that while the safe device 200 may be locked and unlocked using the mechanical key, the safe device 200 may be further secured by other mechanisms such as the body controller 348 and the remote support server 354, as discussed herein.

At block 440, upon receiving the new random key from the body controller 348, the motor controller 352 may update the safe status to be "locked". The process may then end.

Figure 5:
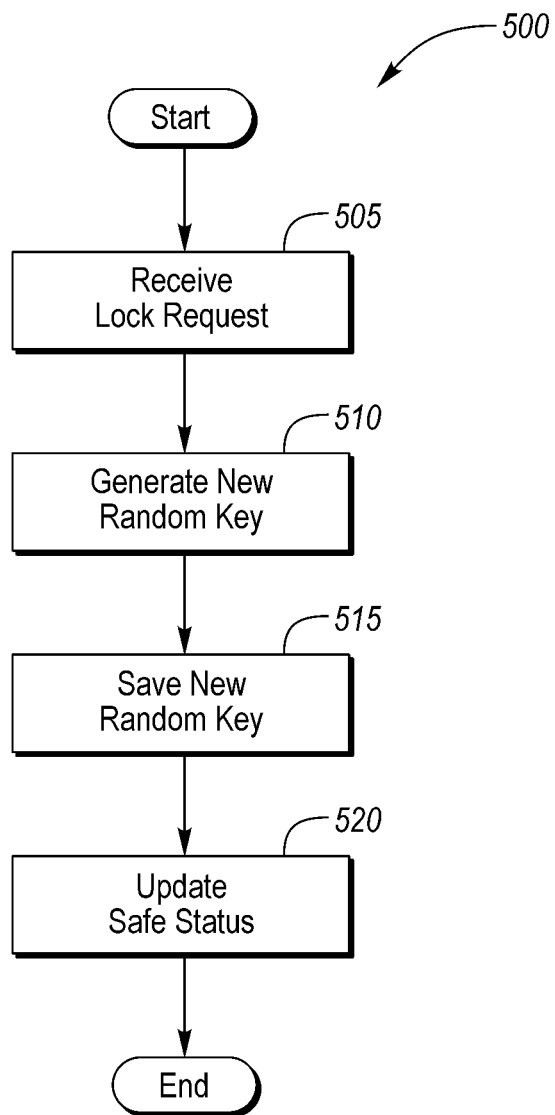
FIG. 5 illustrates an example process for locking the safe device via a mobile application.

FIG. 5 illustrates an example process 500 for locking the safe device 200 using the mobile application 170 at the mobile display 176 and/or the vehicle display 138. These mechanisms may be referred to herein collectively as the interface. The process 500 may begin at block 505 where the body controller 348 may receive a lock request from the interface. The lock request may be transmitted in response to a user selection at the interface. That is, the user may request that the safe device 200 be locked by selecting such option at the interface.

At block 510, the body controller 348, in response to receiving the lock request, may generate a new random key.

At block 515, the body controller 348 may store the new random key and memory.

At block 520 the body controller 348 may update the safe status to be "locked". The process may then end.

Figure 6:
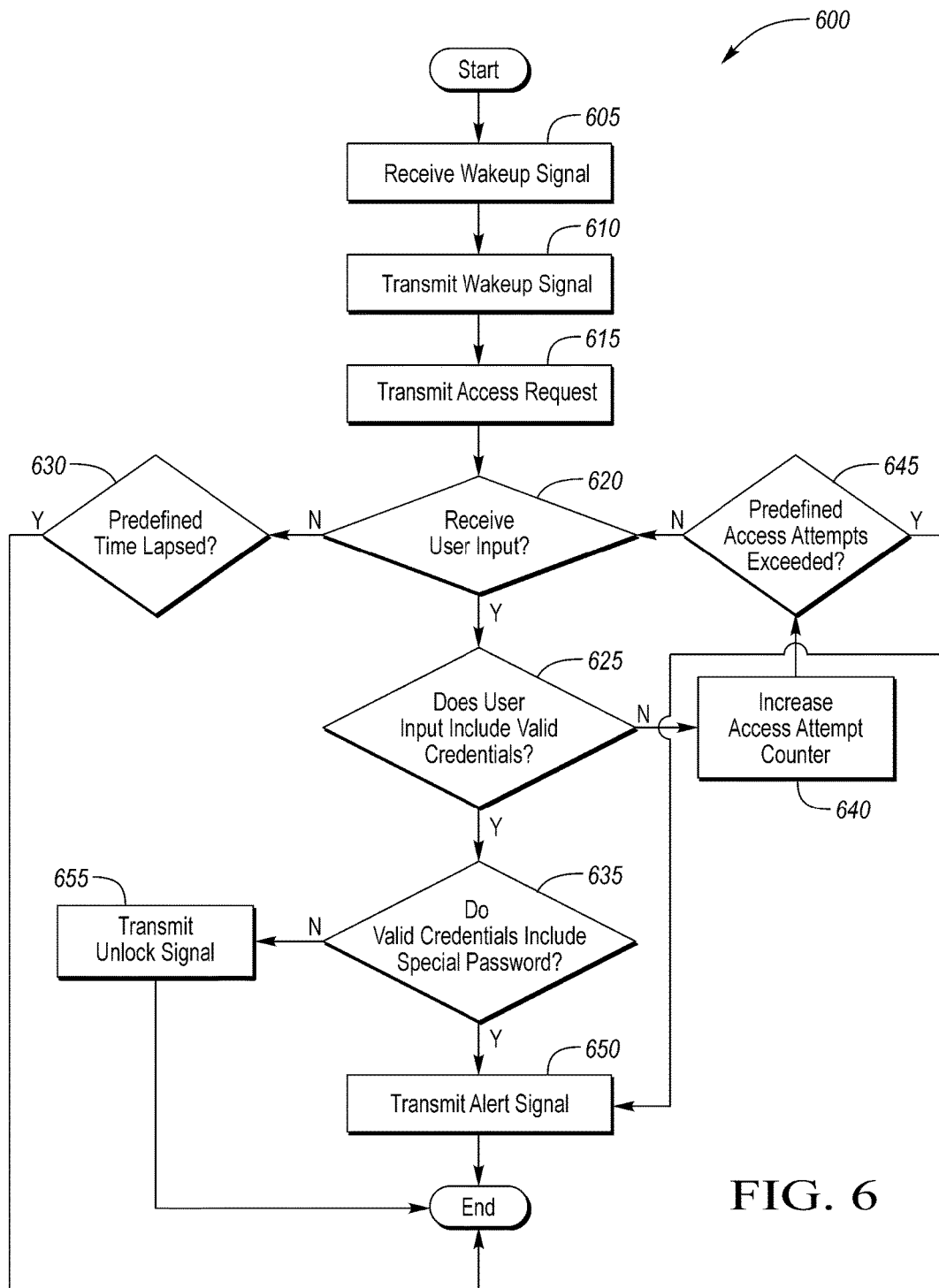
FIG. 6 illustrates an example process for unlocking the safe device via an interface.

FIG. 6 illustrates an example process 600 for unlocking the safe device 200 using the interface (e.g., the vehicle display 138 or mobile device display 176.) The process 600 begins at block 605. At block 605, the body controller 348 may receive a wakeup signal. In one example, the wakeup signal may be initiated by the wakeup button 366 located on or at the vehicle dashboard. That is, once a user enters the vehicle, the user may depress the wakeup button 366. In another example, the wakeup signal may be automatically initiated upon launching the mobile application 170. The mobile application 170 may transmit the wakeup signal via the device link interface 172.

At block 610, once the body controller 348 receives the wakeup signal, the body controller 348 may wakeup the motor controller 352, or CAN bus.

At block 615, the body controller 348 may transmit an access request command to the interface. The commands may instruct the interface to display a password screen. The password screen may invite the user to enter his or her credentials. The credentials may include a password, a user name, biometric input such as thumbprints, facial recognition, or iris scans, etc. The credentials may also be accompanied by the stored randomly generated key so that the motor controller 352 can determine whether the body controller 354 is being imitated.

At block 620, the body controller 348 may wait to receive user input from the interface. The user input may include a password or other biometric or identification data. If the body controller 348 receives user input, the process 600 proceeds to block 625. If not the process proceeds to block 630.

At block 625, the body controller 348 determines whether the user input includes valid credentials. That is, was the appropriate password entered. This determination may be made by comparing known passwords associated with certain user identifications (e.g., those stored in the device data 160) to the password included in the user input. If valid credentials were inputted, the process 600 proceeds to block 635. If not the process proceeds to block 640.

At block 635, the body controller 348 determines whether the valid credentials included a special password. The special password may be an emergency password that may be used to gain access to the safe device 200 in an emergency situation. If a special or emergency password was used, then the process proceeds to block 650. If not, the process proceeds to block 655.

At block 650, the body controller 348, in response to the valid credentials including a special password, may transmit an alert signal to the TCU 356. The alert signal may indicate that a special password was used to gain access to the safe device 200. In response to receiving the alert signal, the TCU 356 may initiate security measures such as acquiring images from the camera 360, acquiring sounds from the microphone 116, and reporting the same as well as the vehicle location, to the remote support server 354. As explained above, use of an emergency password may trigger the second mode, which may be used to prevent unauthorized access, or abuse of the special password. Additionally or alternatively, if there is an emergency, the remote support server 354 may contact the appropriate emergency personnel. For example, if a user is under duress during a robbery situation, the user may use the emergency password to silently trigger the security measures.

At block 630, the body controller 348, in response to user input having not been received, may determine whether a predefined time has been exceeded. That is, has the process 600 timed out. In one example, the process 600 may time out if no user input is received within 30 seconds of transmitting the access request. If no user input has been received within the predefined time, the process 600 ends. If the predefined time has not been exceeded, the body controller 348 continues to wait for user input in the process 600 proceeds back to block 620.

At block 640, the body controller 348, in response to the user input not including valid credentials, may increase an access attempt counter.

At block 645, the body controller 348, may determine whether the access attempt counter exceeds a predefined attempt amount. The predefined attempt amount may include five attempts. If the body controller 348 determines that the access attempt counter does not exceed the predefined attempt amount, the process may proceed back to block 620. If the body controller 348 determines that the access attempt counter does in fact exceed the predefined attempt amount, the process 600 may proceed to block 650.

At block 655, the body controller 348, in response to the valid credentials not including a special password, may transmit an unlocked signal to the motor controller 352 of the safe device 200. The motor controller 352 may in turn instruct the motor to unlock the locking mechanism 220. The process may then end.

Figure 7:
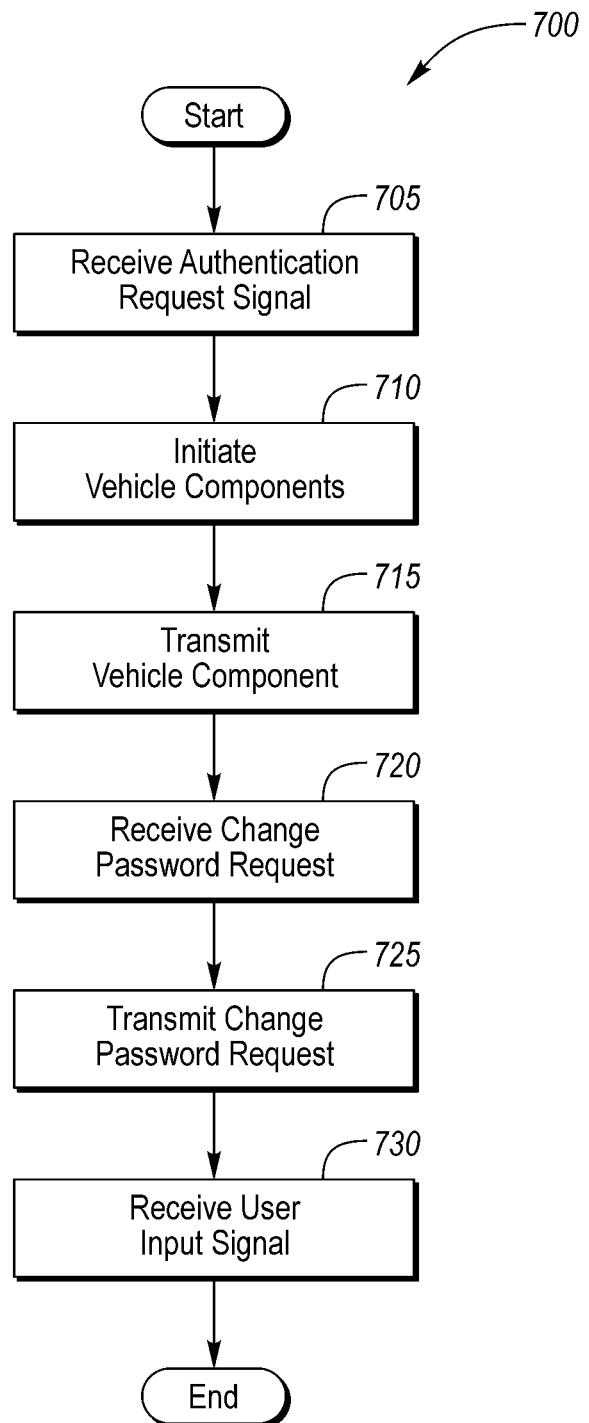
FIG. 7 illustrates an example process for unlocking the safe device in the event of a forgotten password.

FIG. 7 illustrates an example process 700 unlocking the safe device 200 when a user's credentials have been forgotten or misplaced. The process begins at block 705 where the TCU 356 receives an authentication request signal from the body controller 348. The authentication request signal may be initiated based on user input at the interface. In one example, the interface may provide an authentication request option to the user. The authentication request option may permit the user to request his or her credentials and/or be authenticated via another mechanism such as biometric authentication.

At block 710, the TCU 356 may initiate vehicle components such as the camera 360 and/or microphone 116. Initiating the vehicle components may include waking up the components, and/or instructing the components to acquire or capture data (e.g., images and/or sound).

At block 715, the TCU 356 may transmit the vehicle component data to the remote support server 354. The support server 354 may compare the received component data with other user data previously acquired. For example the remote support server 354 may use facial recognition software to compare a previously taken image of the user with the current image transmitted with the vehicle component data. Voice-recognition may also be used. Other data including biometric data such as fingerprints, may also be used to authenticate the user. In another example, the TCU 356 may transmit an authentication link to the user. In one example, the authentication link may be emailed to the user. Upon selection of the authentication link, the remote support server 354 may instruct the TCU 356 of the change password request.

At block 720, the TCU may receive a change password request. The change password request may be transmitted by the remote server 354 in response to the component data authenticating the user.

At block 725 the TCU 356 may transmit the change password request to the body controller 348. The body controller 348 may then send instructions to the interface to prompt the user to enter a new password. The body controller 348 may thus receive user input indicative of the new password. The body controller 348 may save this new password and memory. The body controller 348 may then send a confirmation signal to the TCU 356 indicating that a new password has been saved. The body controller 348 may then proceed to instruct the motor controller 352 to unlock the locking mechanism 220.

At block 730, the TCU 356 may receive the confirmation signal from the body controller 348. Upon receiving the confirmation signal the TCU 356 may also transmit a signal to the remote server 354 indicating that the change password request has been completed. The remote server 354 in one example, may select to charge the user a fee for requiring a password reset, thus discouraging routine use of the authentication request feature. The process may then end.

FIG. 8 is an example process flow 800 for the safe authentication system 300 for activating various vehicle components (e.g., the camera 360 and microphone 116) in response to an authentication threat. At step 805, the body controller 348 may transmit the alert signal to the TCU 356. The body controller 348, as explained above, may transmit the alert signal to the TCU in response to a predefined number of access attempts having been exceeded, and or in response to receiving an authentication request signal to retrieve a forgotten password. The TCU 356, in response to receiving the alert signal, may initiate various security measures in an effort to protect against the possible unauthorized access at the safe device 200. The TCU 356, at step 810, may transmit a vehicle location as recognized by the GPS module 146, to the remote support server 354.

The TCU 356, at step 815, may transmit wakeup signals to the vehicle components. The wakeup signals may include instructions for the components to acquire data such as images or sounds. The images or sounds may potentially capture a potential perpetrator (e.g., an unauthorized user). The images captured by the camera 360 may show at least a portion of the unauthorized user. The sound captured by the microphone 116 may capture the unauthorized user's voice. Although not shown in FIG. 3, other components may also be enabled, such as biometric sensors.

The vehicle components, at step 820, may then transmit component data back to the TCU 356. The TCU 356 may in turn transmit the component data, at step 825, to the support server 354. The support server 354 may compare the component data with previously acquired data. In one example, facial recognition may be used to compare images of a known user space with those of the recently acquired component data. Upon recognizing an authorized user, the support server 354 may transmit an authentication signal back to the TCU 356, indicating that the user is in fact authenticated. This may be the case in the example of a lost or forgotten password. In another example, the support server 354 may transmit the component data, as well as the vehicle location, to the appropriate authorities or emergency personnel. For example the support server 354 may send an image capturing an unauthorized user attempting to access the safe device 200 along with the vehicle location. Upon receiving the information the authorities or emergency personnel may arrive at the vehicle location with a photo of a suspected thief.

Accordingly, described herein is a safe authentication system for an in vehicle safe that maintains several security mechanisms. In one example, in response to a potentially unauthorized user accessing the safe device, the vehicle may enable certain vehicle components, such as the camera, to acquire images of the potential the unauthorized person.

Computing devices, such as the controllers, control units, computing platforms, mobile devices, servers, etc., generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included with in a computing device employing a computer operating system such as one of those mentioned above, and are accessed via a network and any one or more of a variety of manners. A file system may be accessible for a computer operating system, and make the files stored in various formats. An RDBMS generally employs the Structure Query Language (SQL) in addition to language for creating, storing, editing, and executing stored procedures, such as PL/SQL language mentioned above.

In some examples, system elements may be implemented as computer-readable instructions (e.g., software) on one or more computing devices (e.g., servers, personal computers, etc.) stored on computer readable media associated there with (e.g., disks, memories, etc.). A computer program product may comprise such instructions stored in computer readable media for carrying out the functions described herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle safe authentication system, comprising:
a vehicle safe;
a vehicle camera; and
a control unit programmed to receive an indication of unauthorized access, from a body controller and in response to a predefined number of attempts to access the safe being exceeded, at the vehicle safe and further programmed to activate the vehicle camera in response to the indication, wherein activation of the camera includes capturing at least one image.

2. The system of claim 1, wherein the control unit includes a Global Positioning System (GPS) unit configured to identify a location of the safe.

3. The system of claim 2, wherein the control unit is further programmed to transmit the image and the location of the safe to an external server in response to the indication of unauthorized access.

4. The system of claim 1, wherein the control unit is further programmed to receive the indication of unauthorized access from a body controller in response to a user requesting a forgotten password.

5. The system of claim 1, wherein the control unit is further programmed to receive the indication of unauthorized access from a body controller in response to the body controller receiving user input indicative of a special password.

6. A method, comprising:
receiving, from a body controller, an indication of an unauthorized access attempt of an in-vehicle safe;
instructing at least one vehicle component to activate in response to a user requesting a forgotten password, the vehicle component including at least one of a camera and microphone;
identifying a vehicle location;
receiving component data from the vehicle component; and
transmitting the component data and vehicle location to a remote server.

7. The method of claim 6, wherein the indication of an unauthorized access is received in response to a predefined number of attempts to access the safe being exceeded.

8. The method of claim 6, wherein the indication of an unauthorized access is received in response to receiving user input indicative of a special password.

9. A vehicle safe authentication system, comprising:
a vehicle safe;
a vehicle camera; and
a control unit programmed to receive an indication of unauthorized access, from a body controller and in response to the body controller receiving user input indicative of a special password, at the vehicle safe and further programmed to activate the vehicle camera in response to the indication, wherein activation of the camera includes capturing at least one image.

10. The system of claim 9, wherein the control unit includes a Global Positioning System (GPS) unit configured to identify a location of the safe.

11. The system of claim 10, wherein the control unit is further programmed to transmit the image and the location of the safe to an external server in response to the indication of unauthorized access.

12. The system of claim 9, wherein the controller is further programmed to transmit an unlock command to the vehicle safe in response to the user input including a user password.

* * * * *